US012776159B2

(12) United States Patent
Siskos et al.

(10) Patent No.: US 12,776,159 B2
(45) Date of Patent: Oct. 27, 2026

(54) CHARGE SENSOR CIRCUITRY, A DETECTOR ARRAY AND A METHOD FOR CHARGE-BASED SENSING

(71) Applicants: IMEC VZW, Leuven (BE); Katholieke Universiteit Leuven, Leuven (BE)

(72) Inventors: Aris Siskos, Leuven (BE); Florian De Roose, Rumst (BE); Wim Dehaene, Kessel-Lo (BE); Kris Myny, Heusden-Zolder (BE)

(73) Assignee: IMEC VZW, Leuven (BE)

( * ) Notice: Subject to any disclaimer, the term of this patent is extended or adjusted under 35 U.S.C. 154(b) by 159 days.

(21) Appl. No.: 18/629,329

(22) Filed: Apr. 8, 2024

(65) Prior Publication Data

US 2024/0344883 A1 Oct. 17, 2024

(30) Foreign Application Priority Data

Apr. 13, 2023 (EP) .................................... 23167696

(51) Int. Cl.
*G06V 40/13* (2022.01)
*G06F 3/041* (2006.01)
(Continued)

(52) U.S. Cl.
CPC .... *G06V 40/1306* (2022.01); *G06F 3/041661* (2019.05); *G06V 40/1318* (2022.01); *H04N 25/778* (2023.01); *H04N 25/42* (2023.01)

(58) Field of Classification Search
CPC ..................... H04N 25/42; G06V 40/12–1394
See application file for complete search history.

(56) References Cited

U.S. PATENT DOCUMENTS 8,199,236 B2 * 6/2012 Karim .................. H04N 25/766 348/308
8,378,391 B2 * 2/2013 Koyama ............. H10F 39/8037 257/225

(Continued)

FOREIGN PATENT DOCUMENTS

CA 2582243 A1 9/2008
CA 2639498 A1 * 3/2009 ........... H04N 25/766

(Continued)

OTHER PUBLICATIONS

Tsai, et al: "A Graphene/Polycrystalline Silicon Photodiode and Its Integration in a Photodiode-Oxide-Semiconductor Field Effect Transistor", Micromachines 11, 596, pp. 1-16, 2020.

(Continued)

*Primary Examiner* — Patrick F Marinelli
(74) *Attorney, Agent, or Firm* — MOSER TABOADA

(57) ABSTRACT

A charge sensor circuitry comprises: a detector element configured to generate a charge signal at an internal node; wherein the charge sensor circuitry comprises a first transistor comprising a gate for receiving a first control signal and at least one second transistor comprising a first gate connected to the internal node and a second gate for receiving a second control signal; wherein the charge sensor circuitry is configured to, in a first mode, output a first output signal through the first transistor; wherein the charge sensor circuitry is configured to, in a second mode, reset the internal node through the first transistor and output a second output signal through the at least one second transistor.

14 Claims, 8 Drawing Sheets

(51) Int. Cl.
*H04N 25/42* (2023.01)
*H04N 25/778* (2023.01)

(56) References Cited

U.S. PATENT DOCUMENTS

| | | | | |
|---|---|---|---|---|
| 9,319,610 | B2 * | 4/2016 | Wakabayashi | H04N 25/42 |
| 9,635,302 | B2 * | 4/2017 | Wu | G06V 40/1318 |
| 10,614,283 | B2 | 4/2020 | He et al. | |
| 11,417,142 | B2 * | 8/2022 | Chen | G06V 40/1318 |
| 11,776,299 | B2 * | 10/2023 | Yao | G06V 40/1318 348/207.99 |
| 11,825,220 | B2 * | 11/2023 | Watanabe | H10D 62/80 |
| 11,922,844 | B2 * | 3/2024 | Shih | G06V 40/1318 |
| 11,948,959 | B2 * | 4/2024 | Takahashi | H10F 30/225 |
| 12,067,802 | B2 * | 8/2024 | Kobayashi | H10K 65/00 |
| 2008/0291309 | A1 * | 11/2008 | Gruev | H04N 25/677 348/308 |
| 2009/0147118 | A1 * | 6/2009 | Karim | H04N 25/766 348/E5.091 |
| 2013/0075593 | A1 * | 3/2013 | Williams, Jr. | H10F 39/8037 257/461 |
| 2013/0287274 | A1 * | 10/2013 | Shi | G06V 40/12 345/174 |
| 2015/0236061 | A1 * | 8/2015 | Kurokawa | H04N 25/76 257/43 |
| 2016/0037095 | A1 * | 2/2016 | Wu | G06V 40/1318 348/241 |
| 2017/0013214 | A1 * | 1/2017 | Ohmaru | H04N 25/771 |
| 2017/0078606 | A1 * | 3/2017 | Ohmaru | H04N 25/709 |
| 2019/0123089 | A1 | 4/2019 | Doege | |
| 2021/0365660 | A1 * | 11/2021 | Chen | G06V 40/1318 |
| 2021/0374378 | A1 * | 12/2021 | Kobayashi | A61B 5/1171 |
| 2022/0171494 | A1 * | 6/2022 | Shih | G06V 40/1318 |
| 2022/0349749 | A1 * | 11/2022 | Siskos | H04N 25/77 |
| 2023/0317007 | A1 * | 10/2023 | Kim | G06F 3/0412 345/76 |
| 2024/0331641 | A1 * | 10/2024 | Kozuma | G06F 3/042 |
| 2024/0344883 | A1 * | 10/2024 | Siskos | G06F 3/041661 |
| 2025/0029221 | A1 * | 1/2025 | Cheng | H04N 25/78 |
| 2025/0029571 | A1 * | 1/2025 | Abe | G06V 40/1318 |
| 2025/0344529 | A1 * | 11/2025 | Matsumura | H10F 39/12 |

FOREIGN PATENT DOCUMENTS

| | | | | |
|---|---|---|---|---|
| CN | 102523393 A | | 6/2012 | |
| CN | 110460786 A | * | 11/2019 | H04N 25/70 |
| EP | 4084468 A1 | | 11/2022 | |

OTHER PUBLICATIONS

Safavian, et al: "A 3-TFT Hybrid Active-Passive Pixel with Correlated Double Sampling CMOS Readout Circuit for Real-Time Medical X-Ray Imaging", 34$^{th}$ European Solid-State Circuits Conference, Edinburgh, UK, pp. 122-125, 2008.

Extended European Search Report for Application No. 23167696.6 dated Oct. 17, 2023, 5 pages.

Kim, et al., "A High-Speed Wafer-Scale CMOS X-Ray Detector With Column-Parallel ADCs Using Oversampling Binning Method", IEEE Transactions on Electron Devices, vol. 62, No. 3, pp. 888-895, 2015.

* cited by examiner

CHARGE SENSOR CIRCUITRY, A DETECTOR ARRAY AND A METHOD FOR CHARGE-BASED SENSING

CROSS-REFERENCE TO RELATED APPLICATIONS

The present application claims the benefit of and priority to EP Patent Application Serial No. EP 23167696.6, filed Apr. 13, 2023, the entire contents of which is incorporated herein by reference.

TECHNICAL FIELD

The present description relates to a charge sensor circuitry and a method for charge-based sensing configured to enable read-out of a charge signal representative of a physical property. The present description also relates to a detector array comprising an array of charge sensor circuitries.

BACKGROUND

A charge sensor circuitry may comprise a detector element which generates a charge signal representative of a physical property detected by the detector element. For instance, the charge signal may be representative of electromagnetic radiation, such as visible light, incident on the detector element. The charge sensor circuitry may thus provide charge-based sensing of the physical property.

Charge-based sensing may be used in various applications. For instance, charge-based sensing may be used in imaging applications, wherein a plurality of charge sensor circuitries is used for generating charge signals representative of physical properties detected by respective detector elements.

Any sensing of information may need to consider speed and accuracy of read-out of information and a spatial resolution at which the information may be sensed. This may be particularly important for a large area sensor, wherein a large number of charge sensor circuitries are used for detecting a physical property.

A passive charge sensor circuitry, sometimes referred to as a passive pixel sensor, may comprise a detector element and a transistor switch configured to provide read-out of a charge signal generated by the detector element without amplification.

An active charge sensor circuitry, sometimes referred to as an active pixel sensor, may comprise a detector element and one or more amplifier transistors for amplifying a charge signal generated by the detector element and reducing noise added to the charge signal.

The passive charge sensor circuitry may provide fast read-out of charge signals generated by the detector element. However, the passive charge sensor circuitry may provide a low signal-to-noise ratio and may thereby provide a low accuracy of information. Binning of output from a plurality of passive charge sensor circuitry may be used for increasing speed of read-out of information from the plurality of passive charge sensor circuitries while providing a lower spatial resolution.

The active charge sensor circuitry may provide a high signal-to-noise ratio to provide high accuracy of information. However, the active charge sensor circuitry may provide a slow read-out of charge signals generated by the detector element.

A size of the charge sensor circuitry affects a smallest possible distance between adjacent detector elements. Thus, the size of the charge sensor circuitry affects a spatial resolution at which information may be acquired by a plurality of charge sensor circuitries.

There is a need for improvement of charge sensor circuitry to enable read-out of high spatial resolution information from detector elements at a high speed and with high accuracy.

SUMMARY

An objective of the present description is to enable read-out of charge signals generated by detector elements at high spatial resolution, while providing fast and accurate read-out of the charge signals.

This and other objectives are at least partly met by the invention as defined in the independent claims. Preferred embodiments are set out in the dependent claims.

According to a first aspect, there is provided a charge sensor circuitry comprising: a detector element configured to generate a charge signal at an internal node of the charge sensor circuitry, wherein the charge signal is representative of a physical property detected by the detector element; wherein the charge sensor circuitry is configured to operate in a first mode and a second mode for read-out of the charge signal from the charge sensor circuitry, wherein the charge sensor circuitry comprises a first transistor configured to be used in the first mode and the second mode and at least one second transistor configured to be used in the second mode; wherein the first transistor comprises a drain, a source, and a gate, wherein one of the drain or source is connected to the internal node and another of the drain or source is connected for read-out from the charge sensor circuitry and wherein the gate is configured to receive a first control signal; wherein the at least one second transistor comprises a first gate connected to the internal node and a second gate configured to receive a second control signal; wherein the charge sensor circuitry is configured to, in the first mode, activate output of a first output signal through the first transistor based on the first control signal acting to select the first transistor for output; wherein the charge sensor circuitry is configured to, in the second mode, reset the internal node through the first transistor based on the first control signal and output a second output signal through the at least one second transistor based on the second control signal acting to select the at least one second transistor for output.

The charge sensor circuitry according to the first aspect is able to operate in a first mode and in a second mode. The charge sensor circuitry may thus be switched between providing, in the first mode, fast read-out of charge signals generated by the detector element with low accuracy, and providing, in the second mode, slow read-out of charge signals generated by the detector element with high accuracy. That is, the read-out of charge signals may be faster in the first mode than in the second mode, while accuracy of read-out of the charge signals may be better in the second mode than in the first mode. The accuracy of read-out of the charge signals may be better in the second mode than in the first mode in terms of a signal-to-noise ratio of read-out. Also, the charge sensor circuitry may provide a higher dynamic range in the second mode than in the first mode.

Thus, the charge sensor circuitry may provide a versatile operation. This may for instance be utilized such that the charge sensor circuitry may be used in a detector array having a plurality of charge sensor circuitries, wherein a fast and coarse scanning of information may first be provided for the entire detector array operating the charge sensor circuitries in a first mode, and a slower and high accuracy acquisition of information may thereafter be provided for a region of interest operating the charge sensor circuitries in the region of interest in the second mode. Thus, the fast scanning of information may be used to identify regions of interest, such that the slower and high accuracy acquisition of information need only be provided for a sub-set of charge sensor circuitries.

In the second mode for read-out of the charge signal, resetting of the internal node of the charge sensor circuitry may be needed. The charge sensor circuitry comprises a first transistor which is used in the first mode for controlling read-out of the charge signal generated by the detector element and is used in the second mode for resetting the internal node. This implies that the first transistor is used in both the first and the second modes such that a number of transistors of the charge sensor circuitry may be small and that the charge sensor circuitry may occupy a small area allowing a plurality of charge sensor circuitries to be arranged to acquire information at a high spatial resolution.

The detector element may be any element that is configured to generate a charge signal representative of a physical property. The physical property may for instance be electro-magnetic radiation that may be received by the detector element. The detector element may be configured to generate the charge signal in response to the physical property, such as generating the charge signal based on interaction with, e.g., absorption of, the electro-magnetic radiation. The detector element may be configured to generate charges in relation to a quantity of the physical property, such as an intensity or power of the electro-magnetic radiation, such that the charge signal may provide a quantification of the physical property. The physical property may for instance be electro-magnetic radiation, a temperature change, a charge or capacitance, or a mechanical stress.

The detector element may be connected to the internal node of the charge sensor circuitry. The detector element may provide an accumulated charge signal at the internal node. This implies that the charge signal may be accumulated over a time period during which the physical property is detected by the detector element. The time period may be controlled by resetting of the internal node. This may be performed in both the first mode and in the second mode of the charge sensor circuitry.

The first transistor is configured to receive a first control signal at a gate of the first transistor. The first control signal may be configured to control the first transistor to act as a switch such that a channel of the first transistor between the drain and the source could be seen as being open or closed in dependence of the first control signal.

The at least one second transistor is configured to receive a second control signal at a second gate of the at least one second transistor. The second control signal may be configured to control the at least one second transistor to provide a switching action such that a channel of the at least one second transistor between the drain and the source could be seen as being open or closed in dependence of the second control signal.

The first and second gates of the at least one second transistor may be gates of separate transistors or may be two different gates of a common single transistor. The signals on the first and second gates may have different functions, such that the second control signal received on the second gate may be configured to control whether the at least one second transistor is activated to provide an output from the charge sensor circuitry, whereas the signal on the first gate may be amplified by the at least one second transistor. The at least one second transistor may thus provide a gain of the charge signal provided at the first gate of the at least one second transistor.

The charge sensor circuitry may be controlled based on the first and second control signals in order to select output provided by the charge sensor circuitry. The charge sensor circuitry may be configured in the first mode to provide output of a first output signal, wherein the charge signal at the internal node is output through the first transistor between the drain and source of the first transistor for forming the first output signal. The charge sensor circuitry may thus be considered to act as a passive pixel sensor in the first mode.

The charge sensor circuitry may be configured in the second mode to provide output of a second output signal, wherein the charge signal at the internal node is amplified by the at least one second transistor and wherein the second control signal activates a connection between a drain and a source of the at least one second transistor for providing output of the second output signal as an amplification of the charge signal at the internal node. The charge sensor circuitry may thus be considered to act as an active pixel sensor in the second mode.

The charge sensor circuitry may be connected to read-out circuitry for read-out of the first and second output signals, wherein the circuitry may be differently set up if the first and second output signals are to be read out as voltage signals or as charge or current signals. If the read-out circuitry has an open circuit with a current bias, the charge sensor circuitry may operate in a voltage mode, whereas if the read-out circuitry has a short circuit with charge or current sensing, the charge sensor circuitry may operate in a current mode.

The internal node may be connected to a terminal of a capacitor. The charge sensor circuitry may be configured such that the charge signal generated by the detector element inserts charge into the capacitor or extracts charge from the capacitor.

The charge sensor circuitry may be formed by thin-film technology. This implies that the charge sensor circuitry may be formed by deposition of layers (thin films) for forming components of the charge sensor circuitry. The layers may be formed on a substrate, which need not be a semiconductor wafer but may rather be for example a glass substrate. A semiconductor material used by the components, such as the first and the at least one second transistor, of the charge sensor circuitry may be deposited as a layer on the substrate.

Use of thin film technology implies that a size of the substrate may not be limited by sizes of semiconductor wafers and may allow for using the charge sensor circuitry on very large panels. For instance, the charge sensor circuitry may be used in a large display.

According to an embodiment, a source or a drain of the at least one second transistor is connected to a constant bias.

This implies that the at least one second transistor may receive a varying input on the first gate and the second gate, while a constant bias is provided to a source or drain. Hence, the second output signal is dependent on the variation of the signal on the first gate and/or the second gate.

According to an embodiment, the at least one second transistor comprises an amplifier transistor and a select transistor, wherein the amplifier transistor comprises the first gate connected to the internal node and the select transistor comprises the second gate configured to receive the second control signal.

Thus, the charge sensor circuitry may comprise two separate transistors such that the signals on the first gate and the second gate, respectively, are received by different transistors.

The charge sensor circuitry may thus comprise the amplifier transistor which provides an amplification of the charge signal at the internal node and the select transistor which may selectively control output of an amplified signal from the amplifier transistor through the select transistor.

The amplifier transistor may comprise a drain and a source, wherein one of the drain or the source is connected to a constant bias voltage and wherein another of the drain or the source is connected to the select transistor. The select transistor may also comprise a drain and a source, wherein one of the drain or the source is connected to the amplifier transistor and another of the drain or the source is connected to an output node of the charge sensor circuitry. The amplifier transistor and the select transistor may thus be connected by the drain or the source of the amplifier transistor being connected to the drain or the source of the select transistor.

According to an embodiment, the at least one second transistor comprises a single transistor, wherein the single transistor has a front gate forming the first gate connected to the internal node and a back gate forming the second gate configured to receive the second control signal.

This implies that the first gate and the second gate may be gates of a single transistor, such that the charge sensor circuitry may be formed in a compact manner.

In particular, the single transistor may be formed by thin-film technology. It should be realized that the back gate of a transistor formed by thin-film technology does not correspond to a bulk gate of a transistor formed on a semiconductor wafer, in which the bulk gate may sometimes confusingly be referred to as the back gate.

The signals on the front gate and the back gate of the second transistor may provide potentials on opposite sides of a channel of the transistor for controlling the second transistor. The back gate of the second transistor may provide a signal to the second transistor which does not affect any other transistor in the charge sensor circuitry. The control signal on the back gate may thus be used for selectively providing the second output signal from the at least one second transistor for output from the second transistor.

According to an embodiment, the detector element is a photodetector, a pyroelectric sensor, an ion-sensitive field-effect transistor or a bio-sensitive field-effect transistor.

Thus, it should be realized that the charge sensor circuitry may be used in many different applications for sensing a physical property. The detector element may be a photodetector for detecting an electro-magnetic radiation signal, such as ultraviolet light, visible light or infrared light and generate a charge signal accordingly. The detector element may alternatively be a pyroelectric sensor which may be configured to detect infrared electro-magnetic radiation and generate a charge signal accordingly. The detector element may alternatively be an ion-sensitive field effect transistor or a bio-sensitive field-effect transistor for detecting an ion or a biological substance, wherein the detector element may be configured to be sensitive to a particular ion or biological substance.

According to an embodiment, the first transistor and the at least one second transistor are connected to a common output node such that the charge sensor circuitry is configured to provide output in the first mode and the second mode in the common output node.

Thus, the charge sensor circuitry may comprise a single output node. This may ensure that a single data line may be used for extracting output from the charge sensor circuitry. This may be beneficial if the charge sensor circuitry is implemented in a very large array of charge sensor circuitries, since a number of necessary data lines may be much smaller.

According to an embodiment, the first transistor is connected to a first output node and the at least one second transistor is connected to a second output node different from the first output node such that the charge sensor circuitry is configured to provide output in the first output node in the first mode and output in the second output node in the second mode.

This implies that the charge sensor circuitry may be connected to separate dedicated read-out circuitries for reading out the first and the second output signals, respectively, without any need for switches for switching a connection of the output from the charge sensor circuitry to the desired read-out circuitry.

According to a second aspect, there is provided a detector array comprising an array of charge sensor circuitries according to the first aspect, a plurality of data lines connected to the charge sensor circuitries, a first set of first read-out circuitries connected to the data lines for read-out of output of the charge sensor circuitries in the first mode and a second set of second read-out circuitries connected to the data lines for read-out of output of the charge sensor circuitries in the second mode.

Effects and features of this second aspect are largely analogous to those described above in connection with the first aspect. Embodiments mentioned in relation to the second aspect are largely compatible with the first aspect.

Thanks to the use of the charge sensor circuitry according to the first aspect in the detector array, the detector array may be controlled in a versatile manner for acquiring information. The detector array may thus select whether to operate charge sensor circuitries in the first mode or in the second mode. This may for instance be used for very quickly scanning an entire sensitive area of the detector array by using all charge sensor circuitries in the first mode and then acquiring more accurate information for particular portions of the detector array (as identified by the fast scanning) by selectively operating some of the charge sensor circuitries in the second mode.

By using the same charge sensor circuitries in the first mode and in the second mode, the detector array may be able to acquire information with high spatial resolution compared to having a side-by-side implementation of separate passive pixel sensors and active pixel sensors.

According to an embodiment, the array comprises charge sensor circuitries, wherein the first transistor and the at least one second transistor of each respective charge sensor circuitry are connected to a common output node such that each respective charge sensor circuitry is configured to provide output in the first mode and the second mode in the common output node, and the detector array comprises first switches and second switches for selecting whether output of charge sensor circuitries on the data lines is transferred to first or second read-out circuitries.

Thus, each respective charge sensor circuitry may be associated with a single data line. However, the detector array may need switches in order to ensure that the output signals of the charge sensor circuitries are provided to first or second read-out circuitries. The first read-out circuitries may thus be dedicated to read-out of first output signals from the charge sensor circuitries, whereas the second read-out circuitries may be dedicated to read-out of second output signals from the charge sensor circuitries.

According to an embodiment, the array comprises charge sensor circuitries wherein the first transistor of each respective charge sensor circuitry is connected to a first output node and the at least one second transistor of each respective charge sensor circuitry is connected to a second output node different from the first output node such that each respective charge sensor circuitry is configured to provide output in the first output node in the first mode and output in the second output node in the second mode, wherein the detector array comprises a first set of first data lines connected to first output nodes of the charge sensor circuitries and a second set of second data lines connected to the second output nodes of the charge sensor circuitries.

This implies that no switches are needed for connecting the output signals from the charge sensor circuitries to dedicated read-out circuitry for the first and second output signals, respectively.

According to an embodiment, the detector array is configured to bin output from a plurality of charge sensor circuitries as input to a single first read-out circuitry for read-out of output of the charge sensor circuitries in the first mode.

Using binning of output from a plurality of charge sensor circuitries, a speed of read-out of information from the entire array of charge sensor circuitries may be increased and/or a number of first read-out circuitries may be decreased. It should be realized that the information from the entire array of charge sensor circuitries could be simultaneously read out but alternatively the information from different charge sensor circuitries may be sequentially read out by controlling a sequence of connecting different charge sensor circuitries to the first read-out circuitries. Using sequential read-out, the number of first read-out circuitries needed may be substantially reduced.

According to an embodiment, the detector array is configured to selectively activate a sub-set of the second read-out circuitries for read-out of output of the charge sensor circuitries of a region of interest in the second mode.

The detector array may also or alternatively be configured to control output of the second output signal from a selected sub-set of the array of charge sensor circuitries.

It should be realized that the number of second read-out circuitries may be smaller than the number of charge sensor circuitries. Thus, some or all of the second read-out circuitries may be activated in order to allow read-out of the selected sub-set of the array of charge sensor circuitries. Also, the number of charge sensor circuitries in the selected sub-set may be larger than the number of second read-out circuitries such that the second output signals from different parts of the selected sub-set may be sequentially read-out.

Thanks to the detector array enabling selective read-out of second output signals, the second output signals may only be read out from one or more regions of interest. The read-out of second output signals may be slower than the read-out of first output signals, while providing a better signal-to-noise ratio. Thus, by selecting accurate read-out only from region (s) of interest, the detector array may enable fast acquisition of information from the detector elements.

For instance, the detector array may in a first step be configured to identify a region of interest based on read-out of first output signals from the entire array of charge sensor circuitries. The detector array may further be configured in a second step to acquire information with higher accuracy than in the first step from the region of interest operating the charge sensor circuitries in the region of interest in the second mode and reading out second output signals from these charge sensor circuitries. If binning is used when the charge sensor circuitries are operated in the first mode, the detector array may also acquire information in the second step with higher spatial resolution than in the first step by separately reading out the second output signals from each of the charge sensor circuitries of the region of interest.

According to an embodiment, the detector array is configured to be controlled for double delta sampling or correlated double sampling in read-out of output of the charge sensor circuitries.

The double delta sampling or correlated double sampling may provide noise reduction such that an improved signal-to-noise ratio may be provided.

The detector array may comprise sample processing circuitry for processing double samples acquired according to a double delta sampling or correlated double sampling technique. The sample processing circuitry may be shared by the first read-out circuitries and the second read-out circuitries for processing samples acquired in the first mode or in the second mode of the charge sensor circuitries.

According to an embodiment, the first read-out circuitries each comprise a charge-sensitive amplifier.

The first output signal from the charge sensor circuitry may provide a charge by reading out the charge signal at the internal node through the first transistor. The charge-sensitive amplifier may then be configured to convert the charge into a voltage signal, which may facilitate further processing of the first output signal.

According to an embodiment, the second read-out circuitries each comprise a buffer.

The second output signal from the charge sensor circuitry may be formed by amplification through the at least one second transistor. The second read-out circuitry may then not need to convert the second output signal through a charge-sensitive amplifier and may instead comprise a buffer for read-out of a voltage signal. The buffer is a simpler and less expensive component than the charge-sensitive amplifier, such that the second read-out circuitry may be less complex than the first read-out circuitry.

However, it should be realized that the first read-out circuitries and the second read-out circuitries may be implemented in other manners, e.g., in dependence of whether a current signal is to be read-out instead of a voltage signal.

According to a third aspect, there is provided a method for charge-based sensing, said method comprising: generating a charge signal at an internal node of a charge sensor circuitry, wherein the charge signal is representative of a physical property detected by the detector element; operating the charge sensor circuitry in a first mode for read-out of the charge signal, wherein operating the charge sensor circuitry in the first mode comprises: receiving a first control signal at a gate of a first transistor further comprising a drain and a source, wherein one of the drain or source is connected to the internal node and another of the drain or source is connected for read-out from the charge sensor circuitry, wherein the first control signal acts to select the first transistor for output; operating the charge sensor circuitry in a second mode for read-out of the charge signal, wherein operating the charge sensor circuitry in the second mode comprises: resetting the internal node through the first transistor based on the first control signal acting as a reset signal; and receiving a second control signal at a second gate of at least one second transistor, wherein the at least one second transistor further comprises a first gate connected to the internal node, wherein the second control signal acts to select the at least one second transistor for output.

Effects and features of this third aspect are largely analogous to those described above in connection with the first and second aspects. Embodiments mentioned in relation to the third aspect are largely compatible with the first and second aspects.

Thanks to operating the charge sensor circuitry in the first mode and the second mode, the charge sensor circuitry may be controlled in a versatile manner for acquiring information. The charge sensor circuitry may be selected to operate in the first mode or in the second mode in dependence of need. The charge sensor circuitry may be operated in the first mode for quickly identifying whether more accurate information is to be acquired and then the charge sensor circuitry may be selectively operated in the second mode for acquiring more accurate information.

According to an embodiment, the method comprises controlling an array of charge sensor circuitries, wherein the method comprises acquiring information from all charge sensor circuitries of the array of charge sensor circuitries by: for each charge sensor circuitry of the array of charge sensor circuitries, performing said generating and operating the charge sensor circuitry in the first mode.

The method may thus be configured to generate information from all charge sensor circuitries of the array of charge sensor circuitries in a fast manner by operating the charge sensor circuitries in the first mode. This may be used for quickly scanning an entire sensitive area of the array of charge sensor circuitries.

The acquired information may be used for identifying regions of interest, such as regions in which the physical property is present or exceeds a threshold. For instance, the acquired information may be used for identifying regions of interest corresponding to presence of a (particular) object in an image.

According to an embodiment, the method may comprise acquiring information from all charge sensor circuitries by binning output from a plurality of charge sensor circuitries in the array.

Thus, the output from each charge sensor circuitry in the array may not need to be separately read out. This may increase speed of reading out information from the entire array and may be useful in scanning the entire array of charge sensor circuitries for identifying regions of interest from which more accurate information is to be acquired.

According to an embodiment, the method comprises acquiring information from a sub-set of charge sensor circuitries of the array of charge sensor circuitries by: for each charge sensor circuitry of the sub-set of charge sensor circuitries, performing said generating and operating the charge sensor circuitry in the second mode.

The sub-set of charge sensor circuitries may be selected based on identifying a region of interest in information acquired from all charge sensor circuitries, wherein the charge sensor circuitries are operated in the first mode.

Acquiring of information may be slower when operating the charge sensor circuitries in the second mode compared to operating the charge sensor circuitries in the first mode, while the charge sensor circuitries may provide more accurate information and a higher dynamic range in the second mode compared to the first mode. By using only a sub-set of charge sensor circuitries when operating the charge sensor circuitries in the second mode, it is possible to acquire more accurate information from the region of interest. Thus, the relatively slow acquisition of information when operating the charge sensor circuitries in the second mode need not be utilized for the entire array of charge sensor circuitries.

This could be utilized for monitoring information from a large array of charge sensor circuitries to enable a fast update of information from the entire array while also enabling acquiring accurate information, since the accurate information is only acquired for relevant portions of the array.

It should be realized that in embodiments all charge sensor circuitries of the array may be operated in the second mode for acquiring accurate information from the entire array. Thus, it may not be necessary to identify a region of interest in which the charge sensor circuitries are to be operated in the second mode.

BRIEF DESCRIPTION OF THE DRAWINGS

The above, as well as additional objects, features, and advantages of the present description, will be better understood through the following illustrative and non-limiting detailed description, with reference to the appended drawings. In the drawings like reference numerals will be used for like elements unless stated otherwise.

DETAILED DESCRIPTION

Figure 1:
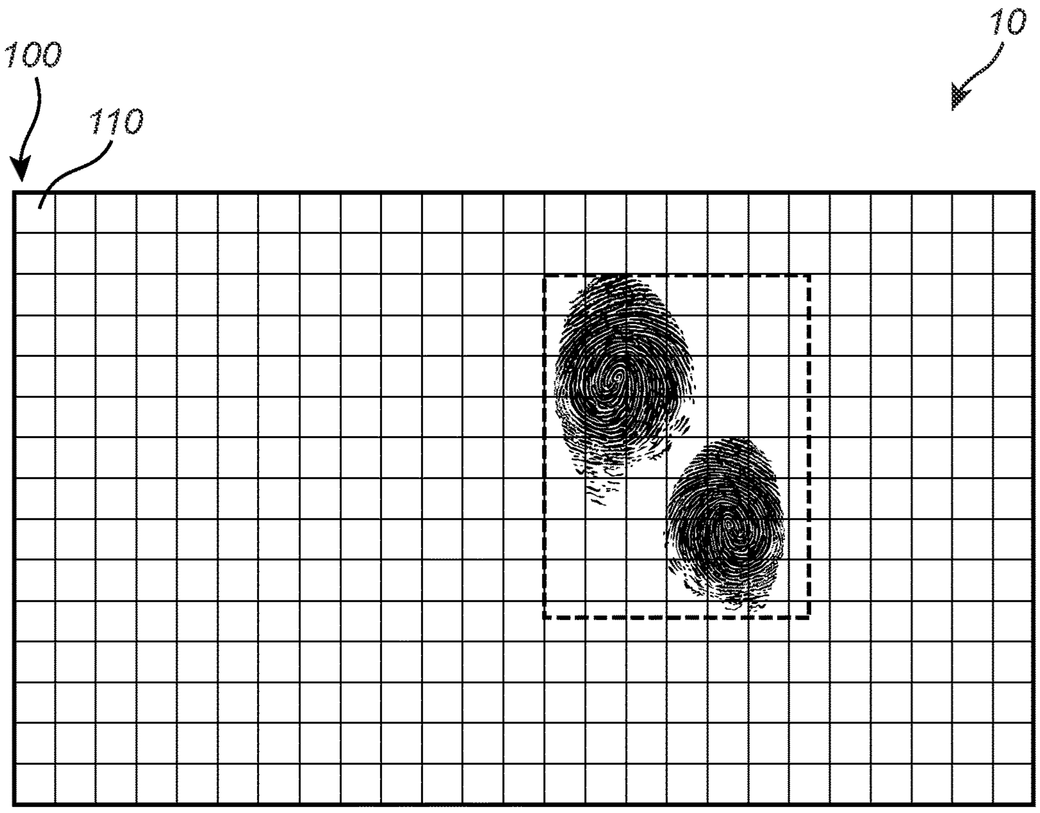
FIG. 1 is a schematic view of a panel in which a detector array according to an embodiment is provided.

FIG. 1 illustrates a large area fingerprint detection panel 10. The fingerprint detection panel 10 comprises a detector array 100, indicating a large number of pixels of the detector array 100. It should be realized that a size of each pixel in FIG. 1 is exaggerated for illustration purposes.

Each element (pixel) in the detector array 100 may be formed by a charge sensor circuitry 110, which will be further described below. The fingerprint detection panel may be very large such that there are a large number of charge sensor circuitries 110 from which information is to be read out. However, there may only be a need of acquiring accurate information in areas where a fingerprint is actually present.

Scanning of the entire area of the fingerprint detection panel 10 may cause large power consumption and may also be time consuming. However, thanks to the detector array 100 comprising charge sensor circuitries 110 that may be operated in a first and a second mode, as will be described in further detail below, the detector array 100 may provide a coarse, fast scanning of the entire panel 10 and may provide an accurate acquisition of information from regions of the panel 10 in which a fingerprint is present.

The same charge sensor circuitry 110 may be used for both the coarse fast scanning and the accurate acquisition of information. This implies that the detector array 100 need not comprise parallel sensors for providing a versatile operation.

It should further be realized that the detector array 100 comprising the array of charge sensor circuitries 110 may be used in various applications. Depending on the application, the charge sensor circuitry 110 may for instance be configured to detect electro-magnetic radiation, such as an intensity or power of the electro-magnetic radiation, or detect a temperature change, a charge or capacitance, or a mechanical stress.

Figure 2:
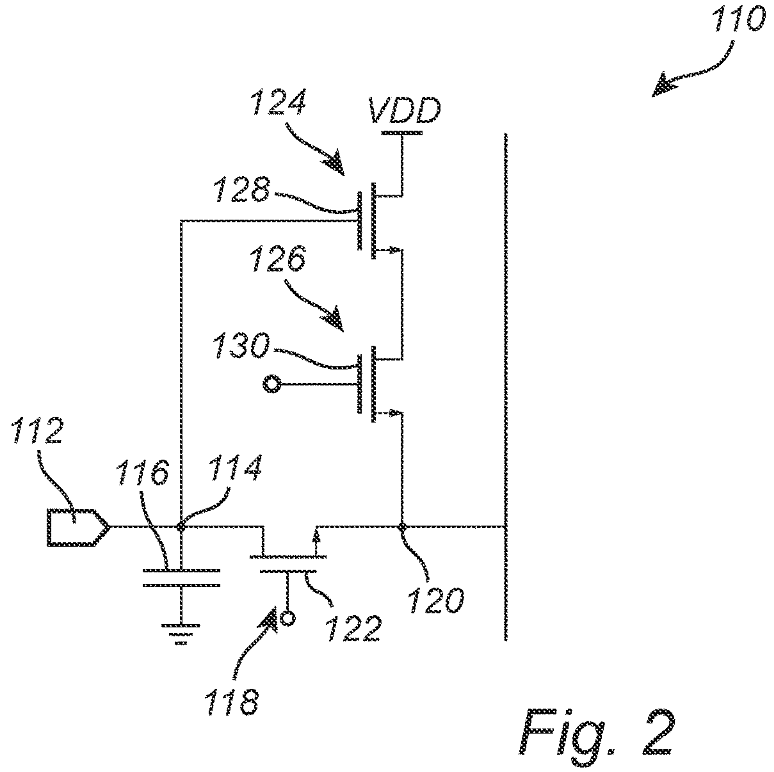
FIG. 2 is a schematic view of a charge sensor circuitry according to a first embodiment.

Referring now to FIG. 2, a charge sensor circuitry 110 according to a first embodiment will be described. The charge sensor circuitry 110 may be operated in a first mode and in a second mode being suitable for use in the detector array 100 that enables a coarse, fast scanning of the entire array and accurate acquisition of information from regions of interest.

The charge sensor circuitry 110 comprises a detector element 112. The detector element 112 is configured to generate a charge signal at an internal node 114 of the charge sensor circuitry 110. The detector element 112 may be configured to detect a physical property and to generate the charge signal representing the detected physical property.

For example, the detector element 112 may be a photodetector for detecting an electro-magnetic radiation signal, such as ultraviolet light, visible light or infrared light and generate a charge signal accordingly. The detector element 112 may alternatively be a pyroelectric sensor which may be configured to detect infrared electro-magnetic radiation and generate a charge signal accordingly. The detector element 112 may alternatively be an ion-sensitive field effect transistor or a bio-sensitive field-effect transistor for detecting an ion or a biological substance, wherein the detector element 112 may be configured to be sensitive to a particular ion or biological substance.

The internal node 114 may be connected to a terminal of a capacitor 116. The charge signal generated by the detector element 112 may insert charge into the capacitor 116 or extract charge from the capacitor 116. The capacitor 116 is illustrated as a capacitor external to the detector element 112. However, it should be realized that the internal node 114 is also related to an intrinsic capacitance of the detector element 112 and to a parasitic capacitance, e.g., associated with wiring in the charge sensor circuitry 110. Thus, the capacitor external to the detector element 112 may not necessarily be needed in order for the internal node 114 to be able to store the charge signal.

The detector element 112 may be directly connected to the internal node 114. The detector element 112 may provide an accumulated charge signal at the internal node 114. This implies that the charge signal may be accumulated over a time period during which the physical property is detected by the detector element.

The charge sensor circuitry 110 may comprise a first transistor 118. The first transistor 118 is illustrated in FIG. 2 as an n-type metal-oxide-semiconductor, NMOS, transistor having a drain connected to the internal node 114 and a source connected to an output node 120 of the charge sensor circuitry. It should be realized that the first transistor 118 may alternatively be a p-type metal-oxide-semiconductor, PMOS, transistor with a source connected to the internal node 114 and a drain connected to the output node 120.

The first transistor 118 comprises a gate 122 configured to receive a first control signal. The first control signal may be configured to control operation of the first transistor 118. The first control signal may be configured to control the first transistor 118 to act as a switch selectively connecting the internal node 114 to the output node 120.

The charge sensor circuitry 110 further comprises at least one second transistor, illustrated in FIG. 2 as two transistors, namely an amplifier transistor 124 and a select transistor 126. The amplifier transistor 124 comprises a first gate 128 which is connected to the internal node 114. The amplifier transistor 124 may be configured to amplify the charge signal and convert the charge signal at the internal node 114 into a voltage or current signal.

The amplifier transistor 124 may be an NMOS transistor comprising a drain connected to a constant bias voltage and a source connected to the select transistor 126. The constant bias voltage may for instance be a positive supply voltage, denoted VDD. The amplifier transistor 124 may alternatively be a PMOS transistor comprising a source connected to the constant bias voltage and a drain connected to the select transistor 126.

The select transistor 126 may be an NMOS transistor comprising a drain connected to the amplifier transistor 124 and a source connected to the output node 120. The amplifier transistor 124 and the select transistor 126 may be connected such that in case NMOS transistors are used, the source of the amplifier transistor 124 is connected to the drain of the select transistor 126 and in case PMOS transistors are used, the drain of the amplifier transistor 124 is connected to the source of the select transistor 126.

The select transistor 126 comprises a second gate 130 configured to receive a second control signal. The second control signal may be configured to control operation of the select transistor 126. The second control signal may be configured to control the select transistor 126 to act as a switch selectively connecting the amplifier transistor 124 to the output node 120.

The charge sensor circuitry 110 is configured to be operated in a first mode or a second mode. The first and second control signals may be used for controlling operation of the charge sensor circuitry 110. The charge sensor circuitry 110 may in the first mode of operation be viewed as a passive pixel sensor, whereas the charge sensor circuitry 110 may in the second mode of operation be viewed as an active pixel sensor.

In the first mode of operation, the second control signal may continuously have a low signal level such that the amplifier transistor 124 and the select transistor 126 are not used for output of a signal from the charge sensor circuitry 110. The first control signal may be used for controlling timing of read-out of the charge signal from the internal node 114 to the output node 120. The first control signal may have a low signal level to allow the charge signal to be accumulated at the internal node 114. The first control signal may then assume a high signal level for reading out the charge signal through the first transistor 118 to the output node 120. The signal output by the charge sensor circuitry 110 in the first mode of operation is referred to as a first output signal. When the first control signal goes back to a low signal level, a next accumulation period for the charge signal at the internal node 114 is initiated.

In the second mode of operation, the charge signal at the internal node 114 is amplified by the amplifier transistor 124. The second control signal may here be used for controlling timing of read-out of the charge signal via the amplifier transistor 124 through the select transistor 126 to the output node 120. The second control signal may have a low signal level to allow the charge signal to be accumulated at the internal node 114. The second control signal may then assume a high signal level for reading out the charge signal via the amplifier transistor 124 through the select transistor 126 to the output node 120. The signal output by the charge sensor circuitry 110 in the second mode of operation is referred to as a second output signal. The first control signal may then assume a high signal level to clear accumulated charge from the internal node 114 and reset the internal node 114 through the first transistor 118 to the output node 120. When the first control signal goes back to a low signal level, a next accumulation period for the charge signal at the internal node 114 is initiated.

Figure 3:
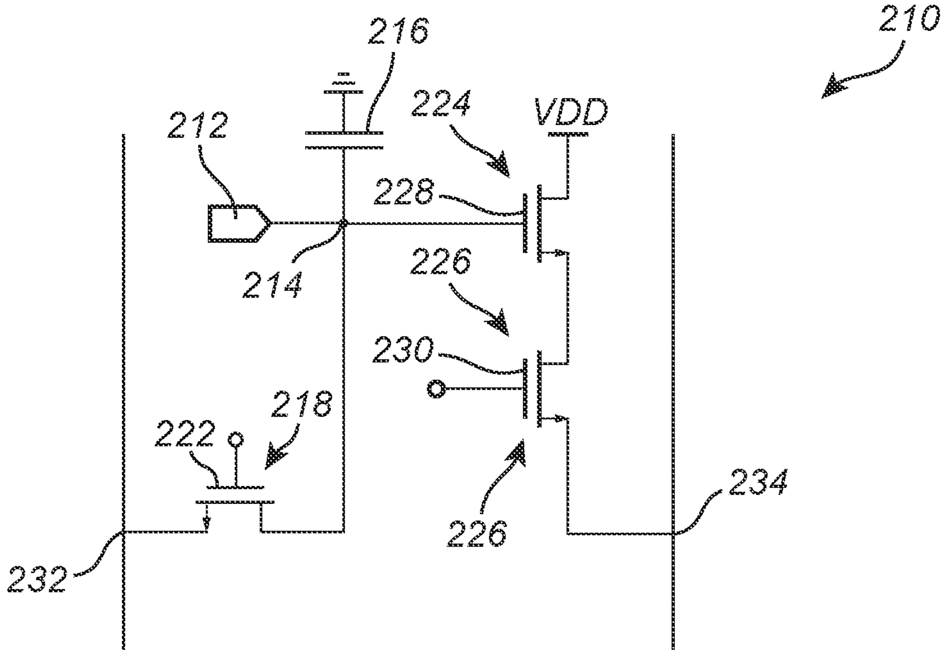
FIG. 3 is a schematic view of a charge sensor circuitry according to a second embodiment.

Referring now to FIG. 3, a charge sensor circuitry 210 according to a second embodiment will be described. The charge sensor circuitry 210 may be operated in a first mode and in a second mode and may like the charge sensor circuitry 110 described above be suitable for use in the detector array 100 that enables a coarse, fast scanning of the entire array and accurate acquisition of information from regions of interest.

The charge sensor circuitry 210 of the second embodiment is similar to the charge sensor circuitry 110 of the first embodiment and, for brevity, the below discussion will focus on the differences of the charge sensor circuitry 210 to the charge sensor circuitry 110.

Like the charge sensor circuitry 110, the charge sensor circuitry 210 comprises a detector element 212, an internal node 214, a capacitor 216, a first transistor 218 with a gate 222, an amplifier transistor 224 with a first gate 228 and a select transistor 226 with a second gate 230.

Whereas the charge sensor circuitry 110 comprises a single output node 120 which is a common output node for output of the first output signal in the first mode and output of the second output signal in the second mode, the charge sensor circuitry 210 comprises two different output nodes.

Thus, the first transistor 218 is connected to a first output node 232 for output of the first output signal. The first transistor 218 may be an NMOS transistor with the source connected to the first output node 232 or may be a PMOS transistor with the drain connected to the first output node 232.

The select transistor 226 is connected to a second output node 234 for output of the second output signal. The select transistor 226 may be an NMOS transistor with the source connected to the second output node 234 or may be a PMOS transistor with the drain connected to the second output node 234.

Apart from the differences described above, the components of the charge sensor circuitry 210 are connected in the same manner as described above for the charge sensor circuitry 110.

The charge sensor circuitry 210 may also be controlled in the same manner as the charge sensor circuitry 110 for operating the charge sensor circuitry 210 in the first and second modes. Thus, the first and second control signals may be identical for controlling output of the first output signal and the second output signal, respectively. The only difference is that the first output signal is output at the first output node 232 and the second output signal is output at the second output node 234 instead of being output at a common node. Also, in the second mode of operation, the internal node 114 is reset through the first transistor being connected to the first output node 232 while the second output signal provided in the second mode of operation is output on the second output node 234.

Figure 4:
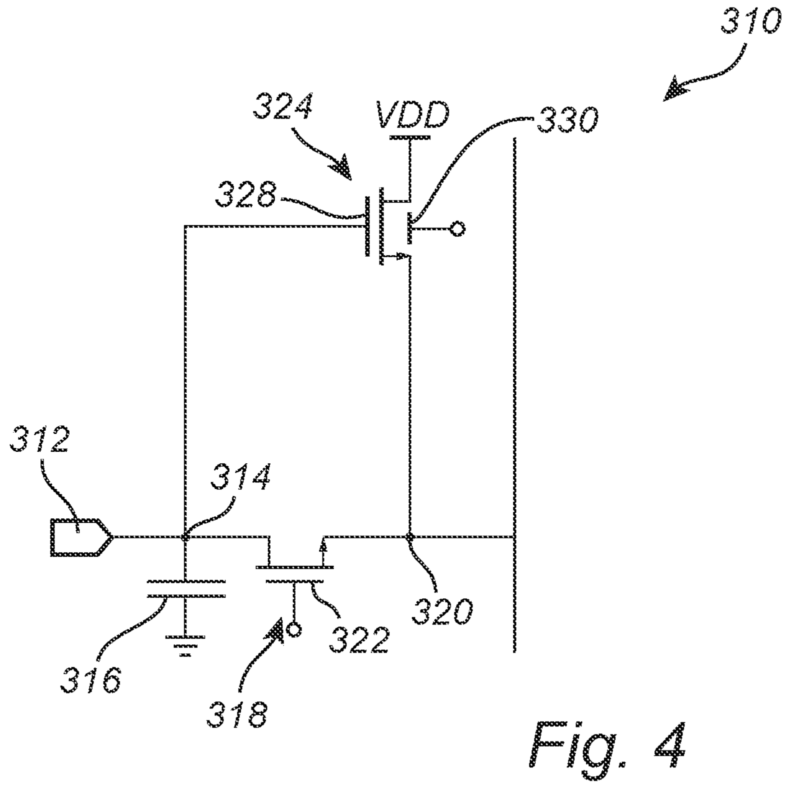
FIG. 4 is a schematic view of a charge sensor circuitry according to a third embodiment.

Referring now to FIG. 4, a charge sensor circuitry 310 according to a third embodiment will be described. The charge sensor circuitry 310 may be operated in a first mode and in a second mode and may like the charge sensor circuitry 110 described above be suitable for use in the detector array 100 that enables a coarse, fast scanning of the entire array and accurate acquisition of information from regions of interest.

The charge sensor circuitry 310 of the third embodiment is similar to the charge sensor circuitry 310 of the first embodiment and, for brevity, the below discussion will focus on the differences of the charge sensor circuitry 310 to the charge sensor circuitry 110.

Like the charge sensor circuitry 110, the charge sensor circuitry 310 comprises a detector element 312, an internal node 314, a capacitor 316, a first transistor 318 with a gate 322, and an output node 320.

Whereas the charge sensor circuitry 110 comprises an amplifier transistor 124 and a select transistor 126 as two separate transistors, the charge sensor circuitry 310 comprises at least one second transistor in form of a single transistor 324. The single transistor 324 comprises a front gate forming a first gate 328 which is connected to the internal node 114. The single transistor 324 further comprises a back gate forming a second gate 330 which is configured to receive the second control signal.

The single transistor 324 may provide a corresponding functionality as the amplifier transistor 124 and the select transistor 126. The single transistor 324 may be configured to amplify the charge signal received at the front gate and convert the charge signal at the internal node 314 into a voltage or current signal. The second control signal may be configured to control operation of the single transistor 324 so as to control timing of providing output of the charge signal at the internal node 314 via the single transistor 324 to the output node 320.

The single transistor 324 may be an NMOS transistor with the drain connected to a constant bias voltage and the source connected to the output node 320 or may be a PMOS transistor with the source connected to a constant bias and the drain connected to the output node 320.

Apart from the differences described above, the components of the charge sensor circuitry 310 are connected in the same manner as described above for the charge sensor circuitry 110.

The charge sensor circuitry 310 may also be controlled in the same manner as the charge sensor circuitry 110 for operating the charge sensor circuitry 310 in the first and second modes. Thus, the first and second control signals may be identical for controlling output of the first output signal and the second output signal, respectively, to the common output node 320.

Figure 5:
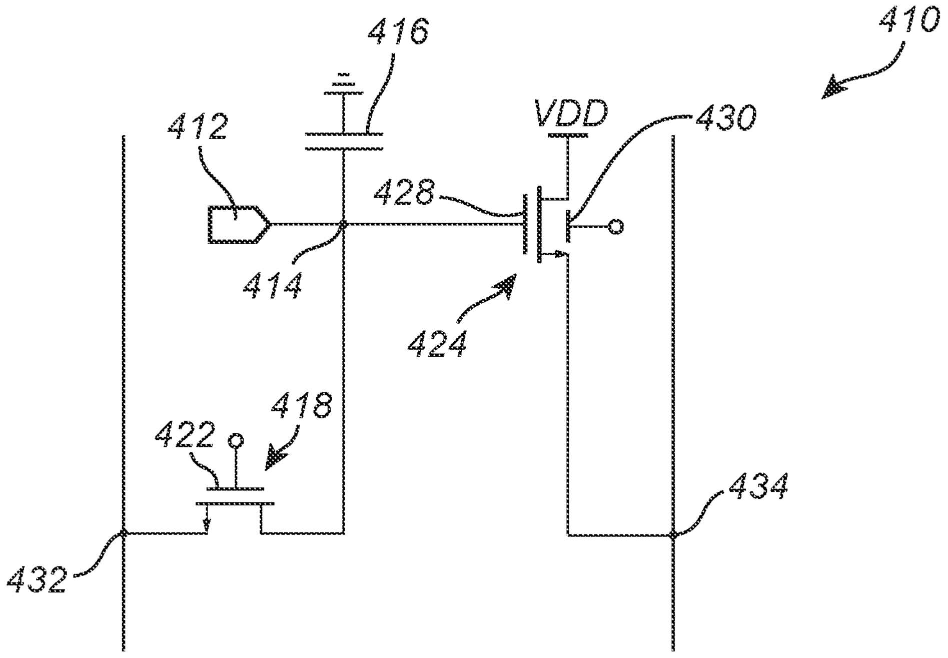
FIG. 5 is a schematic view of a charge sensor circuitry according to a fourth embodiment.

Referring now to FIG. 5, a charge sensor circuitry 410 according to a fourth embodiment will be described. The charge sensor circuitry 410 may be operated in a first mode and in a second mode and may like the charge sensor circuitry 110 described above be suitable for use in the detector array 100 that enables a coarse, fast scanning of the entire array and accurate acquisition of information from regions of interest.

The charge sensor circuitry 410 of the second embodiment is similar to the charge sensor circuitry 310 of the third embodiment and, for brevity, the below discussion will focus on the differences of the charge sensor circuitry 410 to the charge sensor circuitry 310.

Like the charge sensor circuitry 310, the charge sensor circuitry 410 comprises a detector element 412, an internal node 414, a capacitor 416, a first transistor 418 with a gate 422, and a single transistor 424 with a front gate forming a first gate 428 and a back gate forming a second gate 430.

Whereas the charge sensor circuitry 310 comprises a single output node 320 which is a common output node for output of the first output signal in the first mode and output of the second output signal in the second mode, the charge sensor circuitry 410 comprises two different output nodes.

Thus, the first transistor 418 is connected to a first output node 432 for output of the first output signal. The first transistor 418 may be an NMOS transistor with the source connected to the first output node 432 or may be a PMOS transistor with the drain connected to the first output node 432.

The single transistor 424 is connected to a second output node 434 for output of the second output signal. The single transistor 424 may be an NMOS transistor with the source connected to the second output node 434 or may be a PMOS transistor with the drain connected to the second output node 434.

Apart from the differences described above, the components of the charge sensor circuitry 410 are connected in the same manner as described above for the charge sensor circuitry 310.

The charge sensor circuitry 410 may also be controlled in the same manner as the charge sensor circuitry 310 for operating the charge sensor circuitry 410 in the first and second modes. Thus, the first and second control signals may be identical for controlling output of the first output signal and the second output signal, respectively. The only difference is that the first output signal is output at the first output node 432 and the second output signal is output at the second output node 434 instead of being output at a common node. Also, in the second mode of operation, the internal node 414 is reset through the first transistor being connected to the first output node 432 while the second output signal provided in the second mode of operation is output on the second output node 434.

Figure 6:
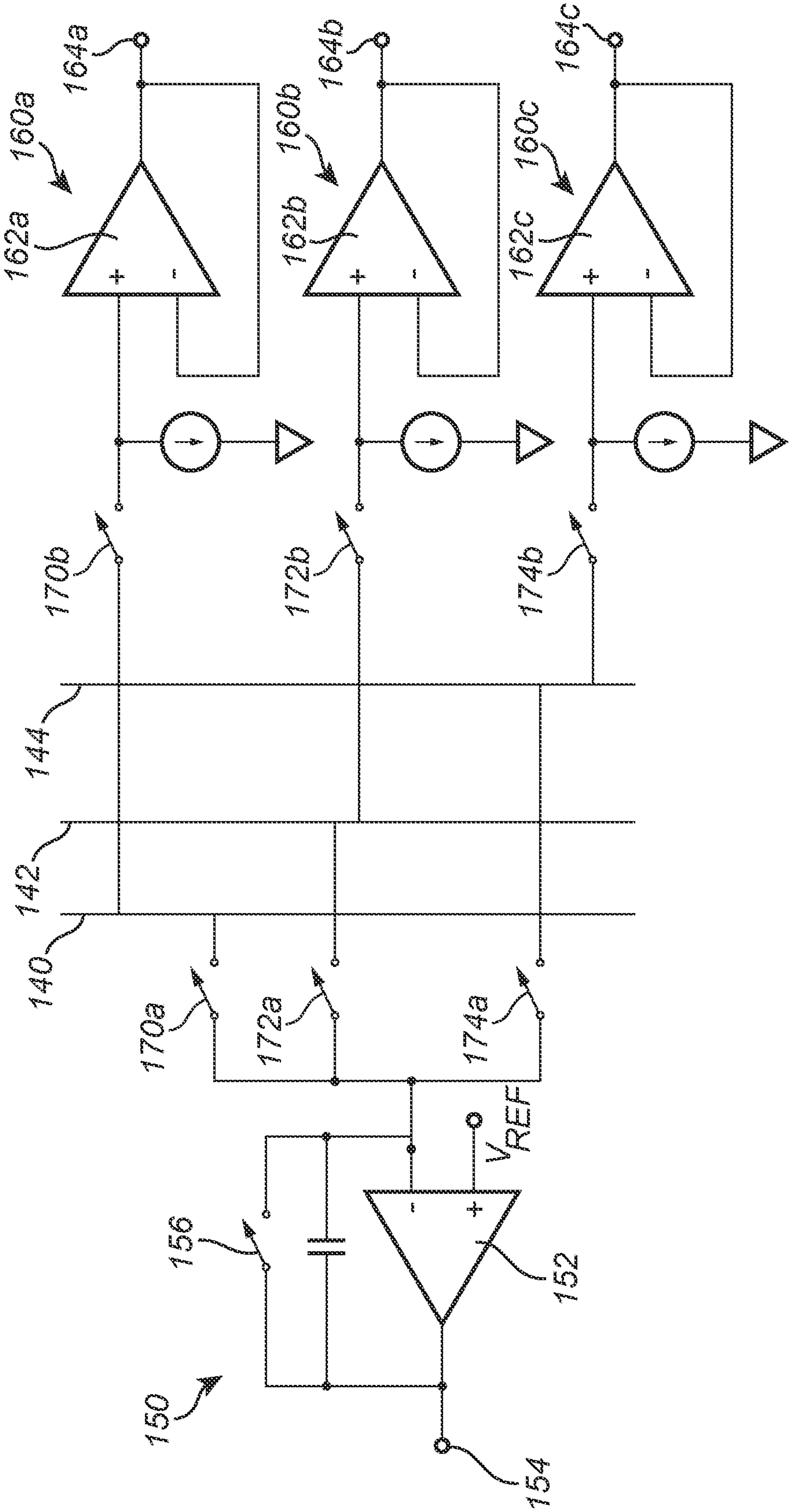
FIG. 6 is a schematic view of read-out circuitry for read-out of output from charge sensor circuitries according to a first embodiment.

Referring now to FIG. 6, read-out of output from charge sensor circuitries according to a first embodiment will be described. As shown in FIG. 6, the detector array 100 may comprise a plurality of data lines 140, 142, 144. The detector array 100 further comprises a first set of first read-out circuitries 150 and a second set of second read-out circuitries 160*a*, 160*b*, 160*c*.

Although a single first read-out circuitry 150 is shown in FIG. 6, it should be realized that a plurality of first read-out circuitries is used, wherein different instances of the first read-out circuitries may be connected to different data lines so as to receive input from different charge sensor circuitries.

The data lines 140, 142, 144 may be shared by the first set of first read-out circuitries 150 and the second set of second read-out circuitries 160*a*, 160*b*, 160*c*. This is used in association with the embodiments of the charge sensor circuitries 110 and 310 illustrated in FIGS. 2 and 4, respectively, wherein each charge sensor circuitry 110, 310 comprises a single output node 120, 320 which is a common output node for output of the first output signal in the first mode and output of the second output signal in the second mode. For simplicity, reference is made below only to charge sensor circuitries 110 but it should be realized that charge sensor circuitries 310 may be used instead.

Each first read-out circuitry 150 is configured for read-out of output from the charge sensor circuitries 110 operating in the first mode. Each second read-out circuitry 160*a*, 160*b*, 160*c* is configured for read-out of output from the charge sensor circuitries 110 operating in the second mode.

Each of the data lines 140, 142, 144 are connected to a respective charge sensor circuitry 110. The detector array 100 further comprises first switches 170*a*, 172*a*, 174*a* and second switches 170*b*, 172*b*, 174*b* for selecting whether an output signal from the charge sensor circuitry 110, 310 providing output on a data line 140, 142, 144 is to be transferred to the first read-out circuitry 150 or the second read-out circuitry 160*a*, 160*b*, 160*c*.

As exemplified in FIG. 6, the first read-out circuitry 150 may comprise a charge-sensitive amplifier 152. The charge-sensitive amplifier 152 may be configured to convert a charge output by the charge sensor circuitry 110 to a voltage signal at an output node 154 of the first read-out circuitry 150. The first read-out circuitry 150 may further comprise a reset switch 156 for resetting an input signal to the charge-sensitive amplifier 152.

As shown in FIG. 6, the data lines 140, 142, 144 may be connected to a single first read-out circuitry 150. Thus, the output from a plurality of charge sensor circuitries 110 may be binned for read-out of output of the charge sensor circuitries 110 in the first mode. This implies that speed of read-out of output from the entire array of charge sensor circuitries 110 may be increased and that a signal-to-noise ratio may be improved.

As mentioned above, it should be realized that a plurality of first read-out circuitries is used. Each first read-out circuitry 150 may for instance be configured to bin output from a few charge sensor circuitries 110, such as four charge sensor circuitries 110. It should further be realized that the detector array 100 may be controlled to selectively use binning or separate read-out of output from single charge sensor circuitries. For instance, the detector array 100 may be configured to sequentially activate the first switches 170*a*, 172*a*, 174*a*, such that output from a single charge sensor circuitry 110 at a time may be provided to the first read-out circuitry 150. Also, the switches 170*a*, 172*a*, 174*a* may be used to control a number of charge sensor circuitries 110 to be used for binning.

Although the first read-out circuitries 150 are shown comprising charge-sensitive amplifiers 150, it should be realized that the first read-out circuitries 150 may be implemented in other manners, as will be appreciated by a person skilled in the art.

As exemplified in FIG. 6, each of the second circuitries 160*a*, 160*b*, 160*c* may comprise a buffer 162*a*, 162*b*, 162*c*. Each buffer 162*a*, 162*b*, 162*c* may receive the second output signal from the respective charge sensor circuitry 110 and may transfer the second output signal to an output node 164*a*, 164*b*, 164*c* such that impedance of processing circuitry receiving the output from the second read-out circuitries 160*a*, 160*b*, 160*c* does not affect or minimally affect the second input signals.

Although the second read-out circuitries 160*a*, 160*b*, 160*c* are shown comprising buffers 162*a*, 162*b*, 162*c*, it should be realized that the second read-out circuitries 160*a*, 160*b*, 160*c* may be implemented in other manners, as will be appreciated by a person skilled in the art. For instance, the second read-out circuitries 160*a*, 160*b*, 160*c* may provide amplification of the second input signals.

The detector array 100 may be controlled to provide a coarse, fast scanning of information based on operating the charge sensor circuitries 110 in the first mode. The first set of first read-out circuitries 150 may thus be activated for read-out of first input signals from the charge sensor circuitries 110. As mentioned above, first output signals from a plurality of charge sensor circuitries 110 may be binned in order to increase speed and improve signal-to-noise ratio in read-out of the first output signals from the charge sensor circuitries 110. The first switches 170*a*, 172*a*, 174*a* may be activated to select the output of the charge sensor circuitries 110 to be transferred to the first read-out circuitry 150 for read-out of the first input signals.

The detector array 100 may be configured to identify a region of interest based on the coarse, fast scanning of information. However, it should be realized that identifying of the region of interest need not necessarily be performed by the detector array 100. For instance, the information acquired by coarse, fast scanning may be transferred to an external unit which may analyze the information and provide a control signal for selecting the region of interest.

The detector array 100 may thus further be configured to selectively read-out second output signals from a sub-set of the charge sensor circuitries 110 corresponding to the region of interest. The selective read-out of second output signals may be achieved by selectively activating output of the second output signals only in the sub-set of charge sensor circuitries 110 and/or by selectively activating a sub-set of the second read-out circuitries 160*a*, 160*b*, 160*c* associated with the charge sensor circuitries 110 corresponding to the region of interest.

The detector array 100 may be configured to provide an accurate acquisition of information by utilizing the second mode of operation of the charge sensor circuitries 110. The signal-to-noise ratio of the second output signals read out in the second mode of operation of the charge sensor circuitries may be improved compared to the signal-to-noise ratio acquired by the coarse, fast scanning of information.

Figure 7:
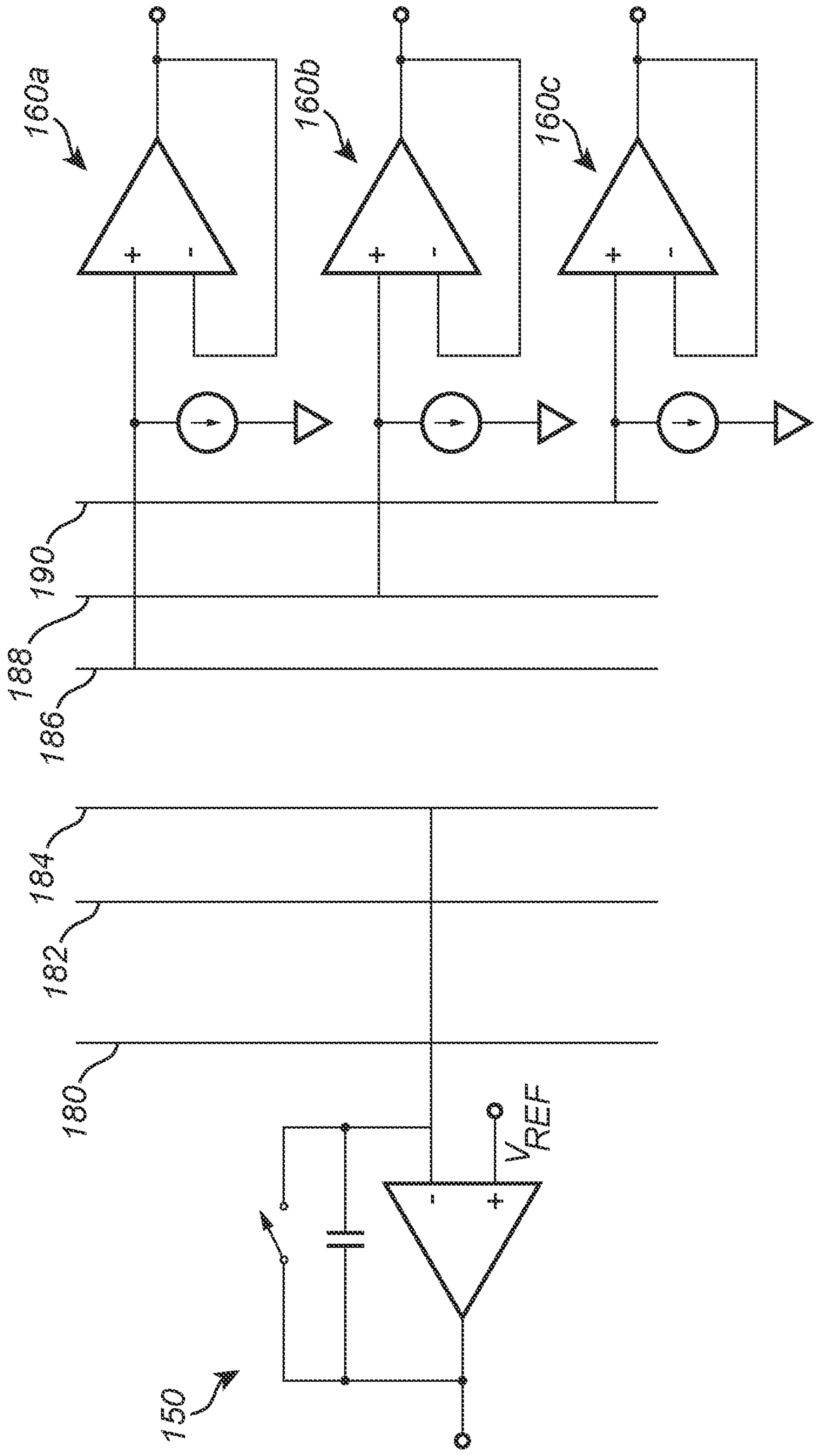
FIG. 7 is a schematic view of read-out circuitry for read-out of output from charge sensor circuitries according to a second embodiment.

Referring now to FIG. 7, read-out of output from charge sensor circuitries according to a second embodiment will be described. The second embodiment differs from the first embodiment shown in FIG. 6 above in that, instead of data lines being shared by the first set of read-out circuitries and the second set of read-out circuitries, the detector array 100 in FIG. 7 comprises data lines which are dedicated to either the first set of read-out circuitries or the second set of read-out circuitries.

The second embodiment for read-out of output from charge sensor circuitries comprises, like the first embodiment, a first set of first read-out circuitries 150 and a second set of second read-out circuitries 160*a*, 160*b*, 160*c*. The first read-out circuitries 150 and the second read-out circuitries 160*a*, 160*b*, 160*c* may be implemented in any of the manners described above for the first embodiment and will not be further discussed here in relation to the second embodiment.

Similar to FIG. 6, a single first read-out circuitry 150 is shown in FIG. 7. However, it should be realized that a plurality of first read-out circuitries is used, wherein different instances of the first read-out circuitries may be connected to different data lines so as to receive input from different charge sensor circuitries.

The detector array 100 in the second embodiment for read-out of output from charge sensor circuitries illustrated in FIG. 7 comprises a plurality of data lines 180, 182, 184, 186, 188, 190. The plurality of data lines comprises a first set of data lines 180, 182, 184 connected to first output nodes of the charge sensor circuitries and a second set of data lines 186, 188, 190 connected to second output nodes of the charge sensor circuitries. This is used in association with the embodiments of the charge sensor circuitries 210 and 410 illustrated in FIGS. 3 and 5, respectively, wherein each charge sensor circuitry 210, 410 comprises a first output node 232, 432 and a second output node 234, 434. For simplicity, reference is made below only to charge sensor circuitries 210 but it should be realized that charge sensor circuitries 410 may be used instead.

The first read-out circuitries 150 are thus configured to receive first output signals from the charge sensor circuitries 210 by the first read-out circuitries 150 being connected to the first output nodes 232 of the charge sensor circuitries 210. Thus, the first read-out circuitries 150 may be used for read-out of the first output signals from the charge sensor circuitries 210 operating in the first mode.

The second read-out circuitries 160*a*, 160*b*, 160*c* are configured to receive second output signals from the charge sensor circuitries 210 by the second read-out circuitries 160*a*, 160*b*, 160*c* being connected to the second output nodes 234 of the charge sensor circuitries 210. Thus, the second read-out circuitries 160*a*, 160*b*, 160*c* may be used for read-out of the second output signals from the charge sensor circuitries 210 operating in the second mode.

Since the first set of first read-out circuitries 150 and the second set of second read-out circuitries 160*a*, 160*b*, 160*c* are connected to the first set of data lines 180, 182, 184 and the second set of data lines 186, 188, 190, respectively, there is no need for switches for switching connection of a data line between a first read-out circuitry and a second read-out circuitry.

In FIG. 7, the first set of data lines 180, 182, 184 are shown as being connected to a common first read-out circuitry 150. This implies that the first read-out circuitry 150 may provide binning of first output signals from a plurality of charge sensor circuitries 210. It should be realized that switches similar to the switches 170*a*, 172*a*, 174*a* shown in FIG. 6 may still be used in order to selectively use binning or separate read-out of output from single charge sensor circuitries 210, or to control a number of charge sensor circuitries 210 to be used for binning. However, it should be realized that, instead of controlling binning by switches between the data lines 180, 182, 184 and the first read-out circuitries 150, binning may be controlled by controlling timing of output of the first output signals to the first output nodes 232 of the charge sensor circuitries 210. By controlling charge sensor circuitries 210 to output the first output signals simultaneously or sequentially, binning of output from plural charge sensor circuitries 210 or separate read-out of output from single charge sensor circuitries 210 may be achieved.

As described above for the first embodiment for read-out of output from charge sensor circuitries, the second embodiment may also be used for providing coarse, fast scanning of information based on operating the charge sensor circuitries 210 in the first mode and accurately acquiring information from a region of interest by read-out of information from a sub-set of charge sensor circuitries 210 being operated in the second mode.

The charge sensor circuitries 110, 210, 310, 410 according to any of the above-described embodiments may be implemented using thin-film technology, using single-gate or dual-gate thin-film technology. Use of thin film technology implies that a size of a substrate on which the array of charge sensor circuitries 110, 210, 310, 410 is formed may not be limited by available sizes of semiconductor wafers. Thus, the array of charge sensor circuitries may be very large facilitating use of the array of charge sensor circuitries in for instance very large area panels.

The first set of read-out circuitries 150 and the second set of read-out circuitries 160*a*, 160*b*, 160*c* in any of the first or the second embodiment for read-out of output from charge sensor circuitries may also be implemented using thin-film technology. The first set of read-out circuitries 150 and the second set of read-out circuitries 160*a*, 160*b*, 160*c* may for instance be implemented using a metal oxide, a polycrystalline silicon material, an organic material, or amorphous silicon as a semiconducting material in thin-film technology. Alternatively, the first set of read-out circuitries 150 and the second set of read-out circuitries 160*a*, 160*b*, 160*c* may be implemented using bulk semiconductor technology, wherein the first set of read-out circuitries 150 and the second set of read-out circuitries 160*a*, 160*b*, 160*c* are formed utilizing a semiconductor material in a semiconductor wafer, which also forms a substrate on which the read-out circuitries are formed.

Figure 8:
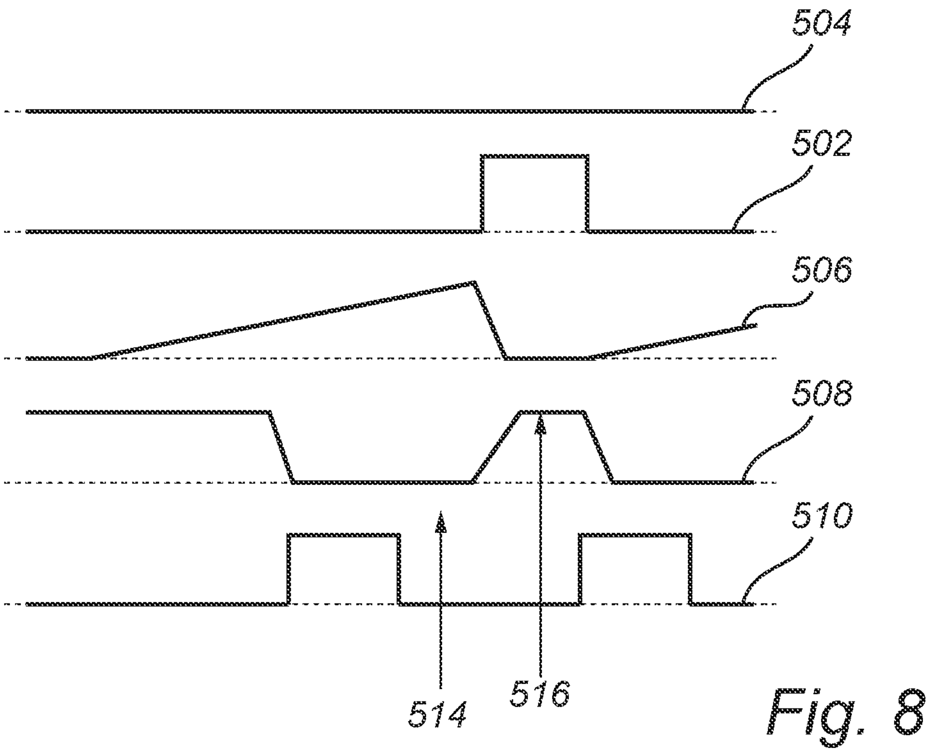
FIG. 8 is a schematic view of signals for read-out of output from a charge sensor circuitry operating in a first mode.

Referring now to FIG. 8, signals for controlling read-out of output from the charge sensor circuitries 110, 210, 310, 410 operating in the first mode will be described. Below, reference is made to the charge sensor circuitry 110 but it should be realized that the signals described below may apply to any of the charge sensor circuitries 110, 210, 310, 410.

If the first embodiment for read-out of output from charge sensor circuitries is used, an additional control signal to the switches 170*a*, 172*a*, 174*a* will be continuously high to select the first read-out circuitry 150 for read-out and an additional control signal to the switches 170*b*, 172*b*, 174*b* will be continuously low so as not to select the second read-out circuitries 160*a*, 160*b*, 160*c* for read-out.

FIG. 8 illustrates the first control signal 502 which is provided to the gate 122 of the first transistor 118, the second control signal 504 which is provided to the second gate 130 of the select transistor 126, a voltage based on the charge signal 506 at the internal node 114, an output signal 508 at the output node 154 of the first read-out circuitry 150 and a control signal 510 controlling the reset switch 156.

In the first mode of operation, the second control signal 504 is continuously low as the amplifier transistor 124 and the select transistor 126 are not used for output of a signal from the charge sensor circuitry 110.

As shown in FIG. 8, the voltage based on the charge signal 506 accumulates during an integration period of time, while the detector element 112 detect the physical property to which it is sensitive and generates the charge signal accordingly.

Before an output signal is read out from the charge sensor circuitry 110, the first read-out circuitry 150 may be reset by activating the reset switch 156. Thus, the control signal 510 goes high to reset a voltage at an input to the first read-out circuitry 150.

A first sample 514 of the output signal 508 may be acquired after the voltage at the input to the first read-out circuitry 150 has been reset. This may be used for using correlated double sampling with the first sample 514 being used to ensure that noise after resetting the input to the first read-out circuitry 150 may be removed.

The first control signal 502 goes high in order to transfer the charge signal 506 to the output node 120 and provide the first output signal on the output node 120 to the first read-out circuitry 150. This implies that charges are drained from the internal node 114 as illustrated in the voltage based on the charge signal 506.

When the first output signal is provided on the output node 120, the first output signal may also be received at the input of the first read-out circuitry 150 such that the output signal 508 from the first read-out circuitry 150 provides a representation of the first output signal of the charge sensor circuitry 110. A second sample 516 of the output signal 508 may then be acquired to represent information detected by the charge sensor circuitry 110.

Figure 9:
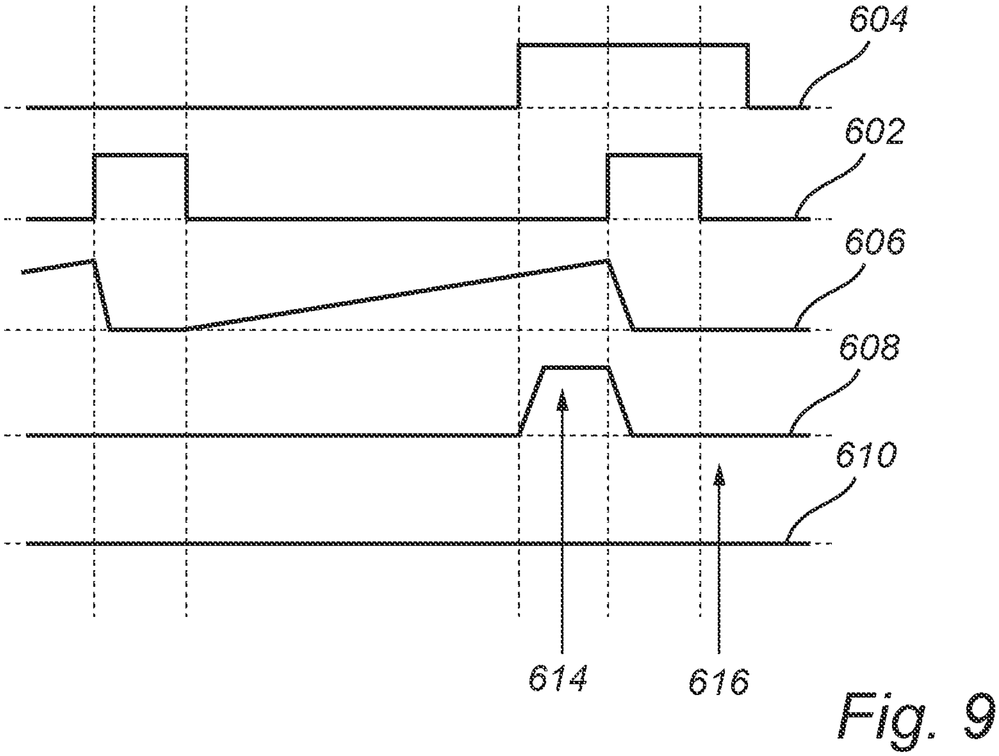
FIG. 9 is a schematic view of signals for read-out of output from a charge sensor circuitry operating in a second mode.

Referring now to FIG. 9, signals for controlling read-out of output from the charge sensor circuitries 110, 210, 310, 410 operating in the second mode will be described. Below, reference is made to the charge sensor circuitry 110 but it should be realized that the signals described below may apply to any of the charge sensor circuitries 110, 210, 310, 410.

If the first embodiment for read-out of output from charge sensor circuitries is used, an additional control signal to the switches 170*b*, 172*b*, 174*b* will be continuously high to select the second read-out circuitries 160*a*, 160*b*, 160*c* for read-out and an additional control signal to the switches 170*a*, 172*a*, 174*a* will be continuously low so as not to select the first read-out circuitry 150 for read-out. For brevity, only the second read-out circuitry 160*a* will be discussed below.

FIG. 9 illustrates the first control signal 602 which is provided to the gate 122 of the first transistor 118, the second control signal 604 which is provided to the second gate 130 of the select transistor 126, a voltage based on the charge signal 606 at the internal node 114, an output signal 608 at the output node 164*a* of the second read-out circuitry 160*a* and a control signal 610 controlling the reset switch 156.

In the second mode of operation, the control signal 610 controlling the reset switch 156 is continuously low as the first read-out circuitry 150 is not used for read-out.

As shown in FIG. 9, the voltage based on the charge signal 606 accumulates during an integration period of time, while the detector element 112 detect the physical property to which it is sensitive and generates the charge signal accordingly.

The second control signal 604 goes high in order to provide an output based on the charge signal 606 via the amplifier transistor 124 and through the select transistor 126 to the output node 120. Thus, the second output signal is provided on the output node 120 to the second read-out circuitry 160*a*. As illustrated the charge signal 606 continues to accumulate with the second output signal following the charge signal 606.

When the second output signal is provided on the output node 120, the second output signal may also be received at the input of the second read-out circuitry 160*a* such that the output signal 608 from the second read-out circuitry 160*a* provides a representation of the second output signal of the charge sensor circuitry 110. A first sample 614 of the output signal 608 may then be acquired to represent information detected by the charge sensor circuitry 110.

After the first sample 614 has been acquired, the first control signal 602 may go high. This implies that charges are drained from the internal node 114 as illustrated in the voltage based on the charge signal 606 so as to reset the signal at the internal node 114 which is also provided at the first gate 128 of the amplifier transistor 124.

A second sample 616 of the output signal 608 may be acquired after the resetting of the internal node 114. This may be used for using double delta sampling in read-out for improving signal-to-noise ratio.

Instead of using double delta sampling, correlated double sampling may be used, which would involve acquiring a reference sample at start of the integration period.

Figure 10:
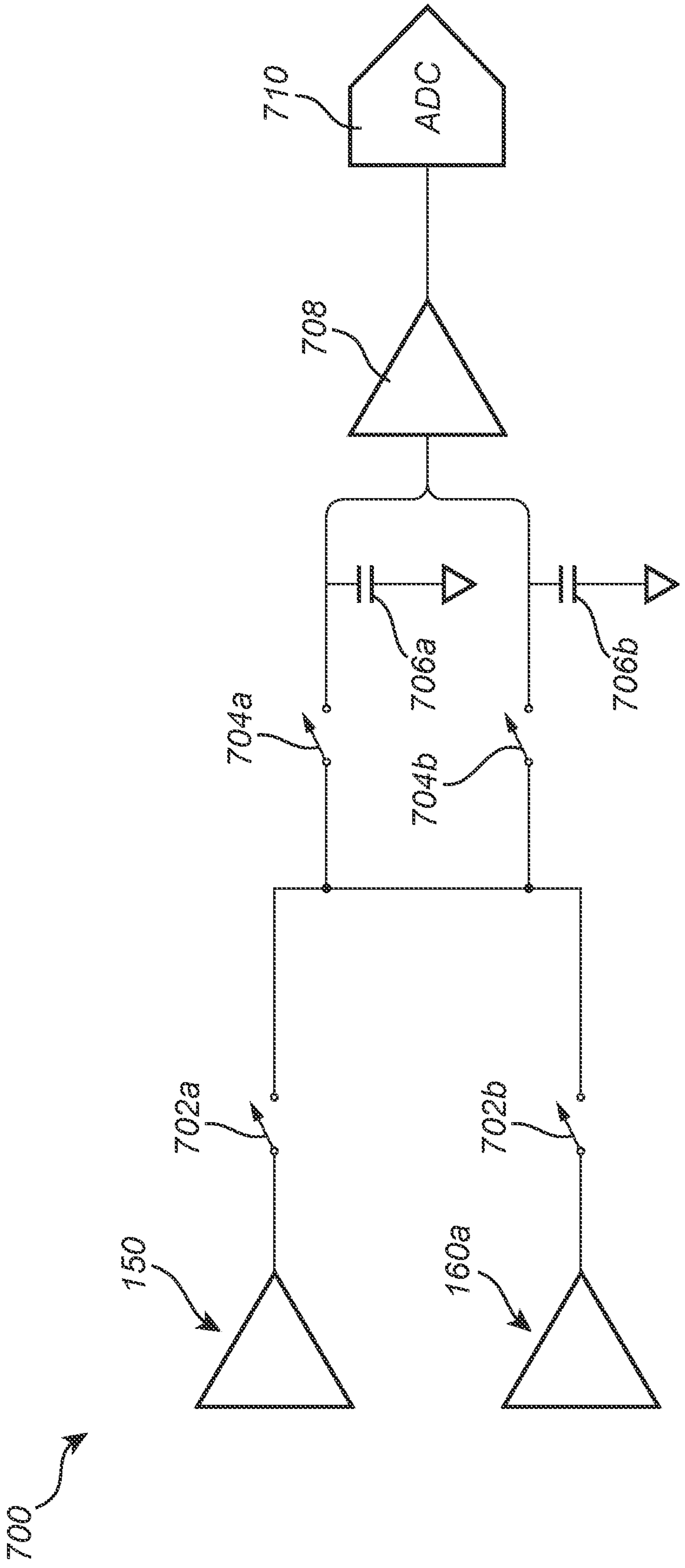
FIG. 10 is a schematic view of processing circuitry for processing signals read out by the read-out circuitry.

Referring now to FIG. 10, the detector array 100 may further comprise processing circuitry 700 for processing output from the first read-out circuitry 150 and the second read-out circuitry 160*a*. For simplicity, only a single first read-out circuitry 150 and a single second read-out circuitry 160*a* are illustrated. As illustrated in FIG. 10, the processing circuitry 700 may be shared by the first read-out circuitry 150 and the second read-out circuitry 160*a*.

The processing circuitry 700 may comprise first switches 702*a*, 702*b* for selecting whether samples are to be acquired from the first read-out circuitry 150 or the second read-out circuitry 160*a*. The first switch 702*a* may be activated for enabling sampling from the first read-out circuitry 150 and the second switch 702*b* may be activated for enabling sampling from the second read-out circuitry 160*a*.

The processing circuitry 700 may further be configured to acquire and temporarily store a first and a second sample. The processing circuitry 700 comprises a first sampling switch 704*a* for activating acquisition of a first sample which may be stored in relation to a first capacitor 706*a*. The processing circuitry 700 further comprises a second sampling switch 704*b* for activating acquisition of a second sample which may be stored in relation to a second capacitor 706*b*.

The first and second samples may be acquired as described above in relation to FIGS. 8 and 9 for enabling correlated double sampling or double delta sampling. The processing circuitry 700 further comprises an amplifier 708, which is configured to subtract a value of the second sample from a value of the first sample so as to provide noise removal.

The amplifier 708 may further be connected to an analog-to-digital converter 710 for converting the read-out value to digital domain. This may facilitate further processing of the information acquired by the charge sensor circuitries 110 in digital domain.

Figure 11:
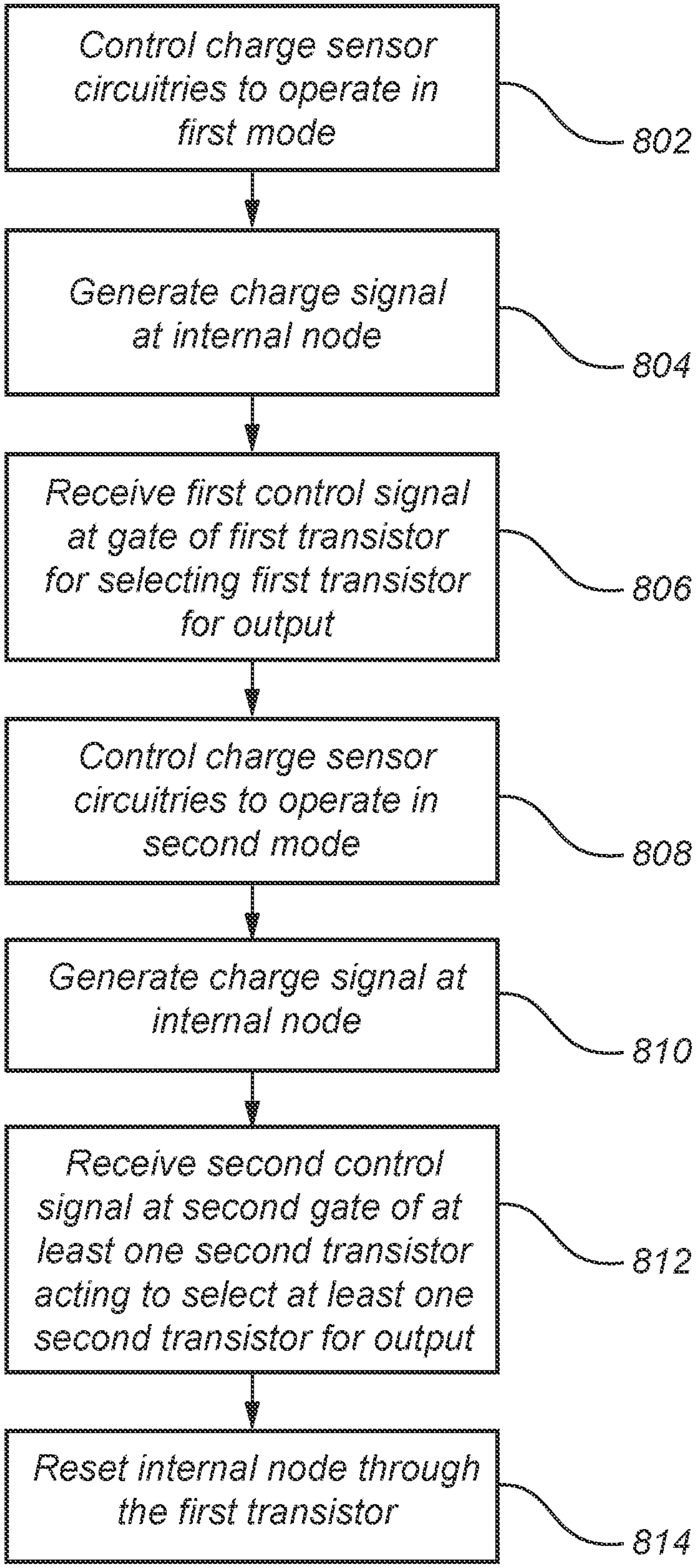
FIG. 11 is a flow chart of a method according to an embodiment.

Referring now to FIG. 11, a method for charge-based sensing will be described.

The method comprises controlling an array of charge sensor circuitries between operating in a first mode and in a second mode. The method may comprise controlling 802 charge sensor circuitries of the array to operate in the first mode. The method may involve controlling all of the charge sensor circuitries of the array to operate in the first mode.

The method may further comprise acquiring information from the charge sensor circuitries in the first mode of the charge sensor circuitries. For each charge sensor circuitry from which information is acquired, the method comprises generating 804 a charge signal at an internal node of a charge sensor circuitry, wherein the charge signal is representative of a physical property detected by the detector element; and operating the charge sensor circuitry in the first mode for read-out of the charge signal.

The operating of the charge sensor circuitry in the first mode for read-out of the charge signal comprises receiving 806 a first control signal at a gate of a first transistor further comprising a drain and a source, wherein one of the drain or the source is connected to the internal node and another of the drain or source is connected for read-out from the charge sensor circuitry, wherein the first control signal acts to select the first transistor for output. The charge sensor circuitry may thus provide output of a first output signal.

The method may further comprise performing read-out of the first output signal through a first read-out circuitry. The method may comprise acquiring information from the charge sensor circuitries by binning output of first output signals from a plurality of charge sensor circuitries in the array.

The method may further comprise controlling 808 charge sensor circuitries of the array to operate in the second mode for acquiring information from the charge sensor circuitries in the second mode of the charge sensor circuitries. The method may involve identifying a sub-set of charge sensor circuitries of the array of charge sensor circuitries, wherein the sub-set is to be used in acquiring information from the charge sensor circuitries in the second mode. The sub-set may for instance be identified as a region of interest based on information acquired from charge sensor circuitries (e.g., all charge sensor circuitries) operating in the first mode.

For each charge sensor circuitry from which information is acquired, the method comprises generating 810 a charge signal at an internal node of a charge sensor circuitry, wherein the charge signal is representative of a physical property detected by the detector element; and operating the charge sensor circuitry in the second mode for read-out of the charge signal.

The operating of the charge sensor circuitry in the second mode for read-out of the charge signal comprises resetting 814 the internal node through the first transistor based on the first control signal acting as a reset signal; and receiving 812 a second control signal at a second gate of at least one second transistor, wherein the at least one second transistor further comprises a first gate connected to the internal node, wherein the second control signal acts to select the at least one second transistor for output. The resetting may occur before the generating of the charge signal or after the receiving of the second control signal at the second gate of the at least one second transistor. The charge sensor circuitry may thus provide output of a second output signal.

The method may further comprise performing read-out of the second output signal through a second read-out circuitry.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A detector array, comprising:

an array of charge sensor circuitries, wherein each charge sensor circuitry comprises:

a detector element configured to generate a charge signal at an internal node of the charge sensor circuitry, wherein the charge signal is representative of a physical property detected by the detector element;

wherein the charge sensor circuitry is configured to operate in a first mode and a second mode for read-out of the charge signal from the charge sensor circuitry, wherein the charge sensor circuitry comprises a first transistor configured to be used in the first mode and the second mode and at least one second transistor configured to be used in the second mode;

wherein the first transistor comprises a drain, a source, and a gate, wherein one of the drain or source is connected to the internal node and another of the drain or source is connected for read-out from the charge sensor circuitry and wherein the gate is configured to receive a first control signal;

wherein the at least one second transistor comprises a first gate connected to the internal node and a second gate configured to receive a second control signal;

wherein the charge sensor circuitry is configured to, in the first mode, activate output of a first output signal through the first transistor based on the first control signal acting to select the first transistor for output;

wherein the charge sensor circuitry is configured to, in the second mode, reset the internal node through the first transistor based on the first control signal and output a second output signal through the at least one second transistor based on the second control signal acting to select the at least one second transistor for output, wherein the detector array further comprises:

a plurality of data lines connected to the charge sensor circuitries;

a first set of first read-out circuitries connected to the plurality of data lines for read-out of output of the charge sensor circuitries in the first mode;

a second set of second read-out circuitries connected to the plurality of data lines for read-out of output of the charge sensor circuitries in the second mode;

wherein the plurality of data lines are shared by the first set of first read-out circuitries and the second set of second read-out circuitries and connected between switches configured to select whether the first output signals and the second output signals provided on the plurality of data lines are to be transferred to the first set of first read-out circuitries or the second set of second read-out circuitries when the charge sensor circuitries are operated in the first mode or second mode, respectively.

2. The detector array according to claim 1, wherein a source or a drain of the at least one second transistor is connected to a constant bias.

3. The detector array according to claim 1, wherein the at least one second transistor comprises an amplifier transistor and a select transistor, wherein the amplifier transistor comprises the first gate connected to the internal node and the select transistor comprises the second gate configured to receive the second control signal.

4. The detector array according to claim 1, wherein the at least one second transistor comprises a single transistor, wherein the single transistor has a front gate forming the first gate connected to the internal node and a back gate forming the second gate configured to receive the second control signal.

5. The detector array according to claim 1, wherein the detector element is are at least one of a photodetector, a pyroelectric sensor, an ion-sensitive field-effect transistor or a bio-sensitive field-effect transistor.

6. The detector array according to claim 1, wherein the first transistor and the at least one second transistor are connected to a common output node such that the charge sensor circuitry is configured to provide output in the first mode and the second mode in the common output node.

7. The detector array according to claim 1, wherein the first transistor is connected to a first output node and the at least one second transistor is connected to a second output node different from the first output node such that the charge sensor circuitry is configured to provide output in the first output node in the first mode and output in the second output node in the second mode.

8. The detector array according to claim 1, wherein, in the charge sensor circuitries of the array, the first transistor and the at least one second transistor are connected to a common output node such that the charge sensor circuitry is configured to provide output in the first mode and the second mode in the common output node.

9. The detector array according to claim 1, wherein, in the charge sensor circuitries of the array, the first transistor is connected to a first output node and the at least one second transistor is connected to a second output node different from the first output node such that the charge sensor circuitry is configured to provide output in the first output node in the first mode and output in the second output node in the second mode, wherein the plurality of data lines comprises a first set of first data lines connected to first output nodes of the charge sensor circuitries and a second set of second data lines connected to the second output nodes of the charge sensor circuitries.

10. The detector array according to claim 1, wherein the detector array is configured to bin output from a plurality of charge sensor circuitries as input to a single first read-out circuitry for read-out of output of the charge sensor circuitries in the first mode.

11. The detector array according to claim 1, wherein the detector array is configured to selectively activate a sub-set of the second read-out circuitries for read-out of output of the charge sensor circuitries of a region of interest in the second mode.

12. The detector array according to claim 1, wherein the detector array is configured to be controlled for double delta sampling or correlated double sampling in read-out of output of the charge sensor circuitries.

13. The detector array according to claim 1, wherein the first read-out circuitries each comprise a charge-sensitive amplifier.

14. A method for charge-based sensing, said method comprising:

generating a charge signal at an internal node of a charge sensor circuitry, wherein the charge signal is representative of a physical property detected by a detector element of a detector array;

operating the charge sensor circuitry in a first mode for read-out of the charge signal, wherein operating the charge sensor circuitry in the first mode comprises:

receiving a first control signal at a gate of a first transistor further comprising a drain and a source, wherein one of the drain or source is connected to the internal node and another of the drain or source is connected for read-out from the charge sensor circuitry, wherein the first control signal acts to select the first transistor for output;

operating the charge sensor circuitry in a second mode for read-out of the charge signal, wherein operating the charge sensor circuitry in the second mode comprises:

resetting the internal node through the first transistor based on the first control signal acting as a reset signal;

receiving a second control signal at a second gate of at least one second transistor, wherein the at least one second transistor further comprises a first gate connected to the internal node, wherein the second control signal acts to select the at least one second transistor for output; and selecting using switches whether the first output signal and the second output signal provided on a plurality of data lines is to be transferred to first read-out circuitry or second read-out circuitry when in the first mode or second mode, respectively, wherein the plurality of data lines are shared by the first read-out circuitry and the second read-out circuitry and connected between the switches.

* * * * *